Feb. 19, 1952 W. MILLIQUET 2,586,475
SECRECY SYSTEM WHEREIN FREQUENCY BANDS OF MESSAGES ARE INTERMIXED DURING MULTIPLEXING
Filed Jan. 27, 1947
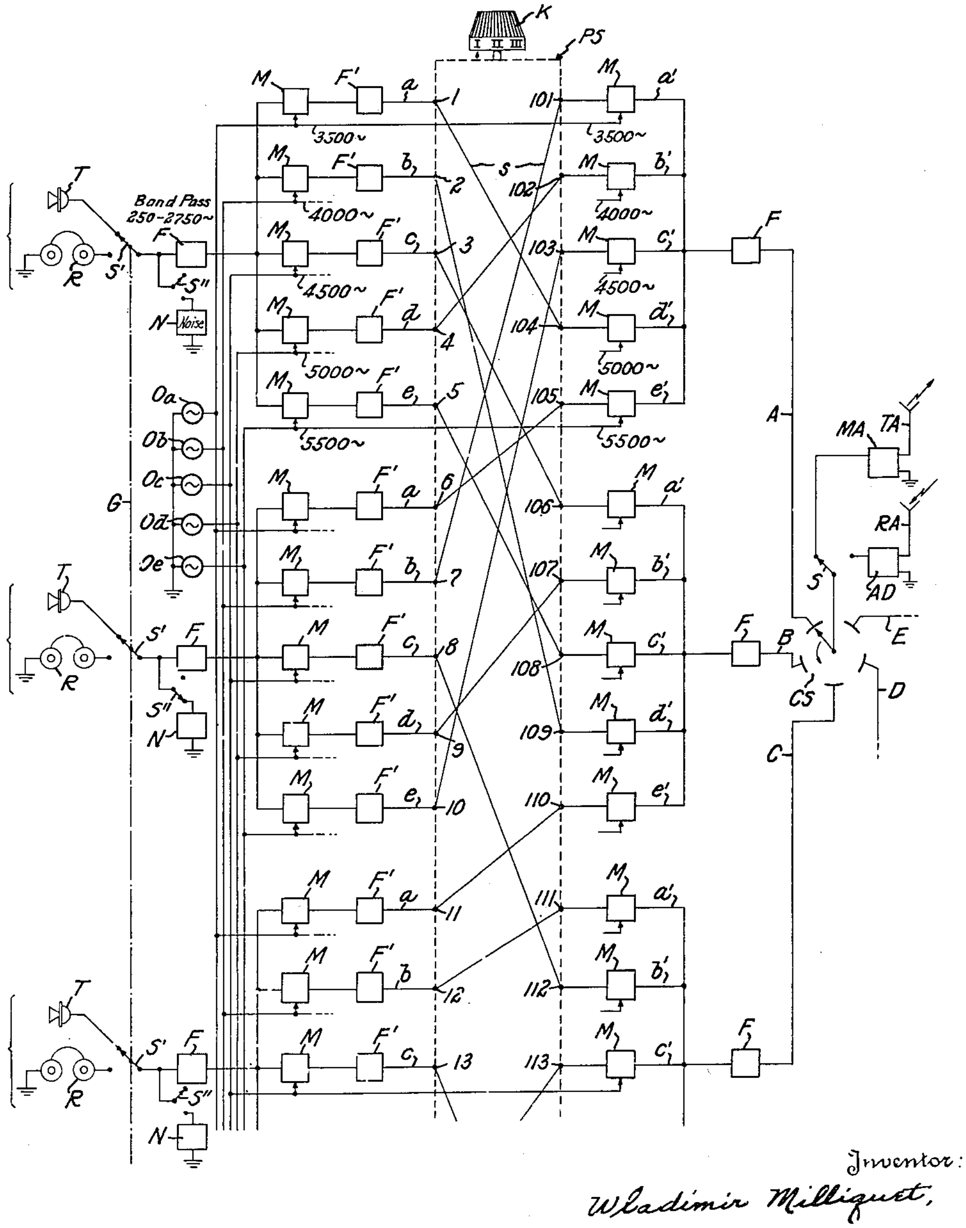
Inventor:
Wladimir Milliquet,
By Pierce, Scheffler & Parker,
Attorneys.

Patented Feb. 19, 1952

2,586,475

UNITED STATES PATENT OFFICE 2,586,475

SECRECY SYSTEM WHEREIN FREQUENCY BANDS OF MESSAGES ARE INTERMIXED DURING MULTIPLEXING

Wladimir Milliquet, Baden, Switzerland, assignor to "Patelhold" Patentverwertungs- & Elektro-Holding A.-G., Glarus, Switzerland Application January 27, 1947, Serial No. 724,604
In Switzerland February 4, 1946

8 Claims. (Cl. 179—1.5)

This invention relates to secrecy systems for the electrical transmission of a plurality of signals, for example speech, over wire or radio channels, and more particularly to processes of and apparatus for rendering secret the individual signals or messages transmitted over a multiplex communication system.

A telephone message may be transmitted with secrecy over a single channel by dividing the message frequency band into a plurality of sub-bands, and interchanging the sub-bands with each other in their relative positions by combining therewith auxiliary oscillations which may invert some or all of the sub-bands. It has also been proposed to obtain secrecy by transmitting a message over two carrier frequencies by a preselected variable interchange of the message and a control tone on the two carriers. Disadvantages of this secrecy system are that two carrier frequencies are required for the transmission of a single message, and that the simple interchange with a control tone is not invulnerable to decoding.

The present invention relates to a process of and apparatus for obtaining increased security against decoding in the electrical transmission of a plurality of signals, for example television signals, voice signals and/or telegraph signals, over wire or radio channels.

Objects of the invention are to provide multiplex communication systems in which the individual signals are divided into sub-bands in frequency, and the sub-bands so obtained from each signal are variously interchanged in preselected manner with each other and with sub-bands of one or more of the other signals. Objects are to provide multiplex communication systems in which frequency sub-bands of the individual signals are interchanged with each other and with sub-bands of other signals according to a preselected code which may be varied from time to time, at uniform or non-uniform intervals, to obtain still greater secrecy of transmission of the individual signals. An object is to provide a multiplex communication system having the characteristics as stated above in which the apparatus is reversible and may be employed, by appropriate automatic or manual switching of circuit connections in known manner, for the coded transmission of a plurality of signals over a single channel or for the decoding reception of a plurality of coded signals arriving over a single channel.

These and other objects and the advantages of the invention will be apparent from the following specification when taken with the accompanying drawing in which the single view is a fragmentary schematic diagram of a terminal station of a multiplex communication system embodying the invention, the station being adapted for radio transmission or radio reception and, with the illustrated adjustment of certain switches, being conditioned for the transmission of several signals over a single channel.

For convenience of description and simplicity of illustration, it will be assumed that each of the significant signals to be transmitted is a spoken or telephone message, and that the signal frequency range of transmission is from about 250 to 2750 cycles per second; i. e. the audio frequency range which is satisfactory for long distance telephony. The particular apparatus which is shown schematically in the drawing includes five message channels which are cyclically connected to the single communication channel, and each message channel includes means for separating the message frequency band into five sub-bands, but it is to be understood that both of these numbers have been selected arbitrarily for purpose of illustration. There must be at least two message channels to obtain the desired secrecy through the interchange of sub-bands of different messages, but any greater number of message channels may be worked into the single communication channel, and the frequency ranges of the several messages may be divided into more or less than the illustrated five sub-bands. All sub-bands of all messages must be of the same width to permit the free interchange of sub-bands of different messages, but it is not essential that the frequency ranges of all message channels be the same. For example, one message channel may pass one or two sub-bands of higher frequencies than the other channels to obtain a higher fidelity in the reception of the message.

The same apparatus may be employed for scrambling and for unscrambling the sub-bands as the operation is reversible and depends upon the direction of transmission of the signals through the apparatus. Separate transmitter and receiver equipment may be provided at each station or, as illustrated, the same equipment may be employed alternatively as a transmitter and as a receiver.

The multiplex transmission system includes a commutator switch CS for cyclically connecting the several message channels A–E in succession to the transmitting antenna TA or to the receiver antenna RA according to the adjustment of the change-over switch S. A modulator and amplifier MA is included in the transmitting antenna lead, and an amplifier and detector AD is included in the receiver antenna lead. The commutator switch CS is shown schematically as a rotary switch but it is to be understood that one of the electronic switch systems commonly employed in multiplex communication systems will be used.

Each message channel A to E includes a switch S′ which is adjustable to terminate the channel in a telephone transmitter T or in a telephone receiver or other reproducer R, the several switches being ganged for simultaneous operation by appropriate means which is indicated schematically by the broken line G. Individually operable switches S″ are provided for connecting noise sources N to the several message channels to supply a signal, preferably one including a wide band of audio frequencies, during intervals when no significant message is introduced through the telephone transmitter T. The noise sources N may be wobbling oscillators or phonograph units for introducing speech or other sound effects to conceal the absence of a significant message on one or more of the message channels.

As illustrated, the switches S′ are adjusted for operation of the station as a transmitter, and switch S″ of channel B is closed to connect its noise source N to that line. The transmitters T of each of the other channels are assumed to be in use. Each message channel is branched into five parallel paths which include circuit elements for dividing the message frequency band into five sub-bands of a uniform width of 500 cycles per second in the assumed case of a message frequency range of from 250 to 2750 cycles per second. Each parallel path includes two sections *a, a′*; *b, b′*, etc., terminating at contacts of a permutation switch PS which is adjustable by a control knob K to connect the sectional paths at opposite sides of the switch in various relations to effect different interchanges of the sub-bands. The knob carries identifying marks, such as Roman numerals I, II, to identify the several settings of the switch PS for different codings or interchanges of the sub-bands of the several messages.

Each message channel is provided with a filter F at each side of the branched paths to limit the transmitted signals to the frequency range of 250 to 2750 cycles per second. This frequency band is divided into sub-bands by modulators M in each section *a, a′*; *b, b′*, of the parallel paths of each message channel, and band-pass filters F′ are located in each path section *a–e* between the associated modulator M and the permutating switch PS. The modulators M may be ring modulators of the disk rectifier type or may be electronic tube modulators. All of the filters F′ have the same characteristic of passing a frequency band of 500 cycles in the frequency range of, for example, 2750 to 3250 cycles per second.

The division of the message frequency range into five sub-bands of a uniform width of 500 cycles each is effected by an appropriate selection of the frequencies of the alternating voltages impressed upon the modulators M of the several branch paths, *a, a′*; *b, b′*, etc., by the local oscillators $O_1$, $O_2$–$O_5$. As indicated by legends adjacent the oscillators, their outputs differ in frequency in steps of 500 cycles from the 3500 cycles per second output from oscillator $O_1$ to the 5500 cycles per second output of oscillator $O_5$. None of the summation modulation products developed in sections *a, b–e* of the branch paths are passed by the filters F′, and only a 500 cycle band of the difference modulation products is passed by the filters. For example, the difference modulation products developed in path sections *a* by modulation of the frequency band of 250 to 2750 cycles with the fixed frequency of 3500 cycles fall in the band of from 750 to 3250 cycles. All frequencies below 2750 cycles per second are suppressed by the filter F′ which passes only the band of 2750 to 3250 cycles which was developed from the message frequency sub-band of 250 to 750 cycles. The modulation frequency for the several sectional paths *b* is 4000 cycles, and the resultant difference modulation products fall in the frequency range of 1250 to 3750 cycles. The band pass filters F′ limit the transmission to the 2750 to 3250 band which was developed from the message frequency sub-band of 750 to 1250 cycles. Similarly the modulation products transmitted by the filters F′ of the path sections *c, d* and *e* correspond respectively to sub-bands of 1250 to 1750, 1750 to 2250 and 2250 to 2750 of the original messages.

The modulating voltage for the modulators M of the path sections *a* and *a′* of all of the message channels A to E are preferably supplied by a single oscillator O*a*, and single local oscillators O*b* to O*e* are also employed to develop the modulating voltages applied to the modulators M of the path sections *b* and *b′*, *c* and *c′*, *d* and *d′*, and *e* and *e′*, respectively. Since the same modulating frequency is imposed upon the modulators M of both sections *a* and *a′*, *b* and *b′*, etc. of each branch path, the sub-band output from any branch path has the same frequency range as the effective message sub-band input to that branch path. The summation modulation products of the second modulations are suppressed by the second set of filters F which pass only the audio range of 250 to 2750 cycles per second, and the effective outputs from the path sections *a′* to *e′* fall within the sub-bands of 250 to 750; 750 to 1250; 2250 to 2750 cycles per second, respectively.

In the drawings, the series of switch contact terminals of the path sections *a* to *e* of the message channels A to E are individually identified by the series of reference numerals 1, 2, 3 . . . , and the switch contact terminals of the corresponding series of path section *a′* to *e′* are identified by numerals 101, 102, 103. . . . The permutation switch PS may be of the rotary cylinder or drum controller type with the two sets of stationary contacts arranged at opposite sides of the axis of the rotary cylinder or drum. A plurality of pairs of diametrically opposed sets of contacts are provided on the rotary cylinder or drum, and the contacts of each opposed set are connected in variously preselected manners by internal switch connections. It will be apparent that each message will be restored to its original form by the second modulation if the internal connections extend radially across the rotary cylinder to connect stationary contacts 1 and 101, 2 and 102, etc. Such a "straight across" connection of the opposed sets of movable switch contacts provides only the low measure of secrecy which is characteristic of any multiplex communication system but one or more of the permutations of the cross-connections, if desired, may be such that there is no scrambling of one of the messages. In general, however, each coding permutation of the cross-connections will effect a transposition of all sub-bands of all messages and an interchange of sub-bands of different messages. An exceedingly large number of permutations is possible when there are several message channels and each message is divided into sub-bands of such relatively narrow width that it is difficult to reconstruct a message from any one sub-band. The number of permutations is so great that a single permutation system for establishing all possible coding combinations will be unduly bulky and quite expensive to manufacture. It is therefore convenient and economical to provide a plurality of interchangeable rotary cylinders or drums which each cover only a portion of the range of permutations.

The illustrated switch connections to the path sections of message channels A and B, and the resultant transposition of sub-bands are listed in the following tabulation.

| Sub-Bands | Permutation Switch Connections | Transposed to Sub-Band |
|---|---|---|
| Message A: | | |
| 250–750 | 1 and 104 | 1750–2250 of A. |
| 750–1250 | 2 and 109 | 1750–2250 of B. |
| 1250–1750 | 3 and 106 | 250–750 of B. |
| 1750–2250 | 4 and 102 | 750–1250 of A. |
| 2250–2750 | 5 and 108 | 1250–1750 of B. |
| Message B: | | |
| 250–750 | 6 and 105 | 2250–2750 of A. |
| 750–1250 | 7 and 101 | 250–750 of A. |
| 1250–1750 | 8 and 112 | 750–1250 of C. |
| 1750–2250 | 9 and 107 | 750–1250 of B. |
| 2250–2750 | 10 and 103 | 1250–1750 of A. |

It will be apparent that a rotation of the switch cylinder through 180° will establish a different series of cross-connections of the opposed sections of the several branch paths. Under either of the adjustments of the switch PS, all sub-bands of the messages will be transposed to other frequency ranges, and the transposed sub-bands of one massage will be interchanged with transposed sub-bands of another message. The scrambled messages which reach the commutator switch CS are transmitted from antenna TA as a series of pulses, and the receiving station or stations are provided with a similar commutator switch for separating the pulses into the groups of pulses derived from the several message channels.

Assuming now that the illustrated apparatus is conditioned for the reception of scrambled messages by throwing switch S to connect the commutator switch CS to the amplifier-detector AD, the unscrambling takes place in the following manner. The groups of signal pulses are distributed to the several message channels in known manner by the commutator switch CS, and the messages pass through the band filters F on their way to the branch paths of the individual message channels. The received messages are effectively divided into sub-bands by the locally produced oscillations which are imposed on the modulators M of the path sections *a'* to *e'* since only the 2750 to 3250 cycles per second band of modulation products will be transmitted along the path sections *a* to *e* to reach the second set of modulators M. The permutation switch PS must be adjusted to the same position as that employed at the transmitting station to distribute the modulation product sub-bands to the particular path sections *a* to *e* in which they will be restored to their original frequency range by the second modulation. For example, the modulation product sub-band developed in path section *a'* of message channel B which can pass a filter F' corresponds to the incoming message sub-band of 250 to 750 cycles. Reference to the above tabulation shows that this transmitted sub-band was developed from the 1250 to 1750 cycles sub-band of the message introduced at the transmitter T of message channel A. The modulation products developed in path section *a'* of message channel B are passed by switch PS to the path section *c* of message channel A where they are filtered to suppress all but the 2750 to 3250 cycles band which is then restored, by modulation with an alternating voltage of 4500 cycles per second, to the original band range of 1250 to 1750 cycles per second. The other sub-band components of the received signals are similarly returned to their original message channel and transposed to their original sub-band range. The second modulation also produces summation modulation products sub-bands but these are all suppressed by the band pass filters F and do not reach the reproducers R.

The invention provides secrecy of a high order as it would be most difficult for unauthorized persons to determine any one coding plan for the interchange of the sub-bands of one message with each other and with sub-bands of one or more additional measures, and the difficulty in identifying and decoding any one message is increased still further by adjusting the permutation switch PS from time to time, at regular or irregular intervals, to change the coding system.

The specific design of various elements of the multiplex communication systems contemplated by the invention may conform to current practice in the art, and it is to be understood that the invention is not limited to the embodiment which is herein described and schematically illustrated. The scrambled messages may of course be transmitted over land lines or cables, and as audio frequency signals or as modulation applied to a carrier wave. The described process and apparatus for obtaining a high order of secrecy in a multiplex communication system are believed to be broadly new, and various modifications therefore fall within the spirit and scope of the invention as defined in the following claims.

I claim:

1. In the operation of a secrecy communication system for the transmission and reception of a plurality of independent telephone message signals, the process which comprises dividing each signal into a plurality of frequency sub-bands, developing a plurality of scrambled signals by interchanging a sub-band of one signal with a sub-band of another signal, and varying from time to time the frequency ranges of the sub-bands of different signals which are interchanged.

2. In the operation of a secrecy communication system for the transmission and reception of a plurality of independent telephone message signals, the process which comprises dividing each signal into a plurality of frequency sub-bands, transposing sub-bands of each signal to other frequency ranges, interchanging transposed sub-bands of different signals according to a code, and changing the code from time to time.

3. In a secrecy telephone communication system, the combination with a plurality of message channels, each message channel having a transmission frequency band range sufficiently wide to pass all frequencies required for intelligible transmission and reception of a spoken message, message source means for imposing different individual and intelligible speech messages upon the respective message channels, and communication channel means for all of the message channels, of means including fixed-frequency oscillators for dividing the transmission frequency band of each message channel into a plurality of sub-bands of the same band width, and means for scrambling the sub-bands of each message channel to develop a scrambled message for transmission over each message channel, said scrambling means including means for interchanging some of the sub-bands of different message channels.

4. In a secrecy telephone communication system, the combination with a plurality of message channels, each message channel having a transmission frequency band range sufficiently wide to pass all frequencies required for intelligible transmission and reception of a spoken message, message source means for imposing different individual and intelligible speech messages upon the respective message channels, and communication channel means for all of the message channels, of means including fixed-frequency oscillators for dividing the transmission frequency band of each message channel into a plurality of sub-bands of the same band width, and adjustable scrambling means for transposing each sub-band to a different frequency range according to preselected scrambling codes to develop a scrambled message for transmission over each message channel; said scrambling means including means for interchanging a transposed sub-band of one message channel with a transposed sub-band of another message channel.

5. In a secrecy communication system, a plurality of message channels each message channel having a transmission frequency band range sufficiently wide to pass all frequencies required for the intelligible transmission and reception of a spoken message, an independent message source for each message channel, and circuit means for connecting each message source to its message channel to impose thereon individual messages or signals which are independent of messages or signals imposed on other message channels, a plurality of parallel branch paths in each message channel, each branch path including two sections, a modulator in each section of each branch path, means for imposing upon both modulators of each branch path alternating voltages of the same frequency, the frequencies of the voltages imposed upon the modulators of the several branch paths of each message channel being different, filters in each branch path to limit the frequency range of transmission to a common frequency sub-band, and an adjustable permutation switch for cross-connecting the opposed sections of the several branch paths to each other in one of a number of arbitrary preselected manners to transpose the frequency sub-bands of each original message with each other and with sub-bands of another message according to preselected code scramblings.

6. In a secrecy communication system, the invention as recited in claim 5, wherein said circuit means includes filters in each message channel to limit the frequency of range of transmitted signals to a preselected frequency range which includes all of said sub-bands.

7. In a secrecy communication system, the invention as recited in claim 5, wherein said means for imposing alternating voltages comprises, for each branch path of a message channel, a single source of alternating voltage.

8. In a secrecy communication system, the invention as recited in claim 5, wherein said means for imposing alternating voltages comprises, for all branch paths of the same sub-band range in the several message channels, a single source of alternating voltage.

WLADIMIR MILLIQUET.

REFERENCES CITED

The following references are of record in the file of this patent:

UNITED STATES PATENTS

| Number | Name | Date |
|---|---|---|
| 1,526,335 | Griggs | Feb. 17, 1925 |
| 1,666,651 | Heising | Apr. 17, 1928 |
| 1,725,566 | Chestnut | Aug. 20, 1929 |
| 1,762,984 | Heising | June 10, 1930 |
| 1,829,783 | Chestnut | Nov. 3, 1931 |
| 2,094,132 | Miller | Sept. 28, 1937 |
| 2,132,205 | Dickieson | Oct. 4, 1938 |
| 2,213,320 | Mathes | Sept. 3, 1940 |
| 2,263,369 | Skillman | Nov. 18, 1941 |
| 2,407,259 | Dickieson | Sept. 10, 1946 |
| 2,411,683 | Guannella | Nov. 26, 1946 |